United States Patent [19]
Bracha et al.

[11] Patent Number: 5,798,937
[45] Date of Patent: Aug. 25, 1998

[54] METHOD AND APPARATUS FOR FORMING REDUNDANT VIAS BETWEEN CONDUCTIVE LAYERS OF AN INTEGRATED CIRCUIT

[75] Inventors: Gabriel Bracha, Tel Aviv; Eytan Weissberger, Ramat Hasharon; Yehuda Volpert, Petah-tikva; Ilan Algor, Ganei-tikva, all of Israel

[73] Assignee: Motorola, Inc., Schaumburg, Ill.

[21] Appl. No.: 535,427

[22] Filed: Sep. 28, 1995

[51] Int. Cl.[6] ................................................. G06F 17/50
[52] U.S. Cl. ........................... 364/490; 364/491; 257/774
[58] Field of Search .................... 395/500; 364/488–491; 257/774

[56] References Cited

U.S. PATENT DOCUMENTS

| | | | |
|---|---|---|---|
| 5,155,302 | 10/1992 | Nguyen | 774/88 |
| 5,483,461 | 1/1996 | Lee et al. | 364/490 |

OTHER PUBLICATIONS

Cheng et al, Multi–Level Logic Optimization by Reducing Addition and Removal pp. 373–377.

Michalka et al, A Redundant Metal–Polymide Thin Film Interconnect Process for Wafer Scale Dimensions, pp. 158–164.

Uttecht et al, A Four–Level–Metal Fully Planarized Interconnect Technology for Dense High Performance Logic and SRAM Applications.

Michalka et al, "A Redundant Meta–Polymide Thin Film Interconnection Process for Wafer Scale Dimensions", 1990.

Evans et al, "Designing and Building—In Realiability in Advance Microelectronic Assemblies and Structures", 1995.

New Riverside University Dictionary, Webster, 1994, p. 987, Houghton Mifflin Company, Jan. 1994.

*Primary Examiner*—Kevin J. Teska
*Assistant Examiner*—Tyrone V. Walker
*Attorney, Agent, or Firm*—Keith E. Witek

[57] ABSTRACT

A method for forming one or more redundant vias (38a–38x) around a critical via (36) involves providing an integrated circuit design file (12) containing several overlay layers. Critical vias in the file (12) are identified via a step (16). Several redundant vias are serially placed around and connected in parallel to the critical via (36), and design rules are checked for each redundant via by performing steps (24–30). Redundant vias which do not violate design rules (26) are kept in a separate redundant overlay layer and added to the design of the integrated circuit. The added redundant vias increase the yield of the integrated circuit by bolstering the integrity of critical via connections.

39 Claims, 5 Drawing Sheets

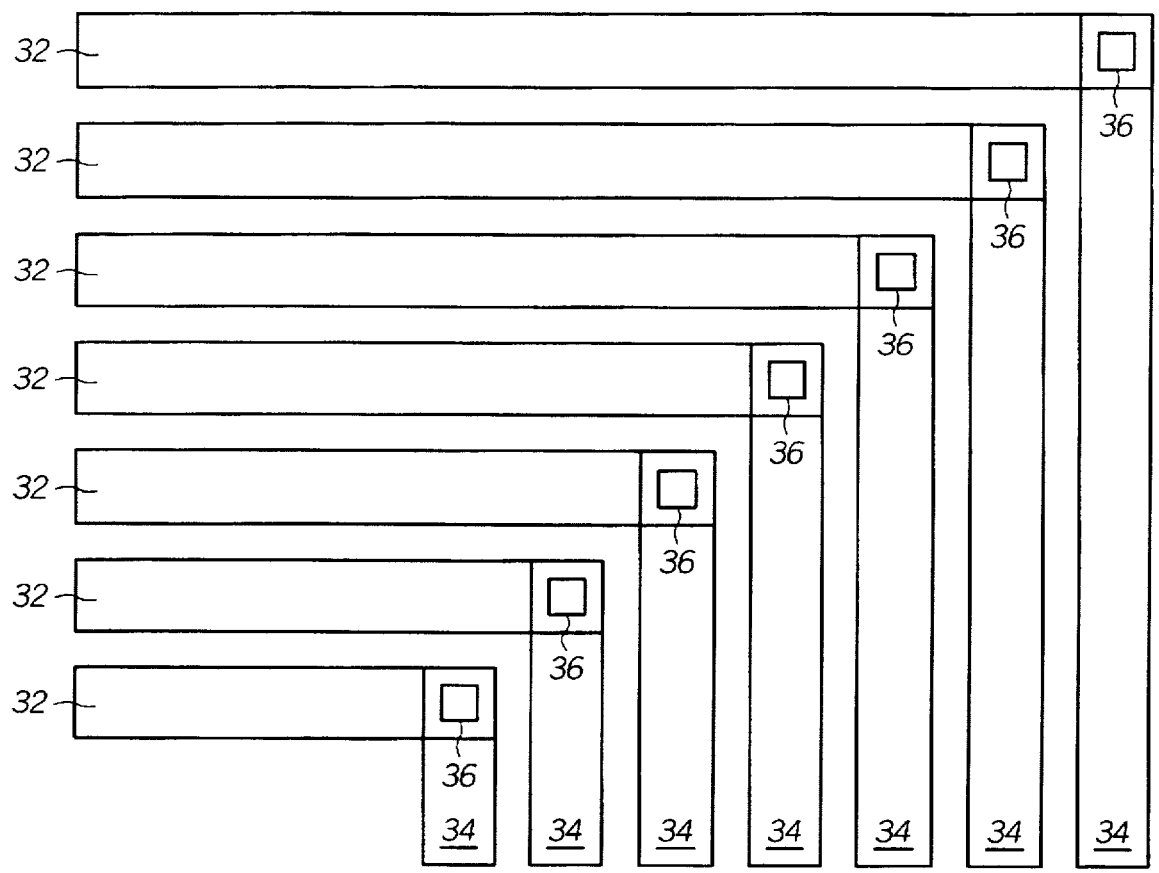
FIG. 4
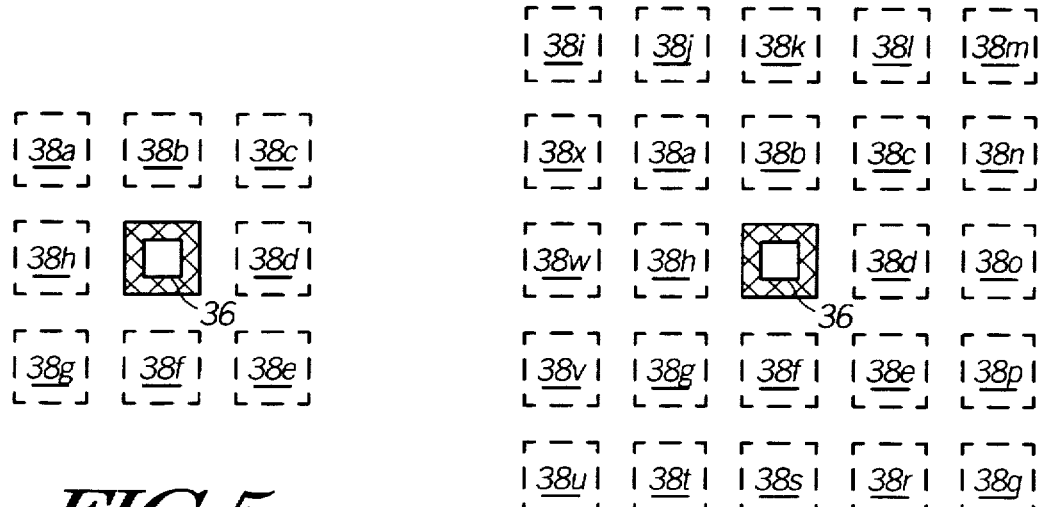
FIG. 5
FIG. 6

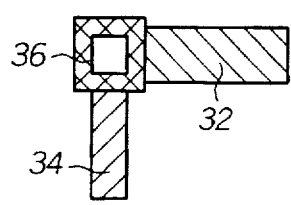 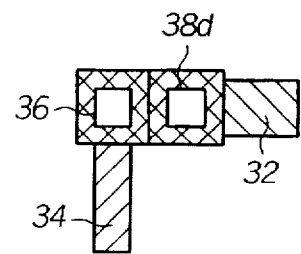
*FIG. 7*  *FIG. 8*
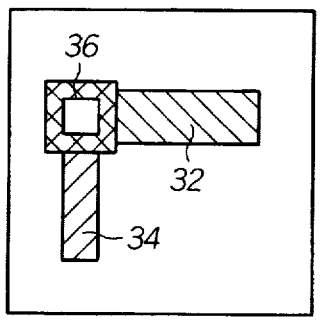 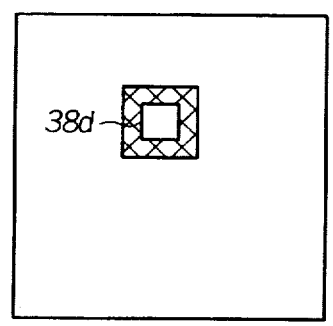
*FIG. 9*  *FIG. 10*
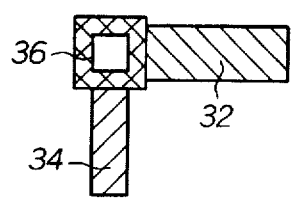 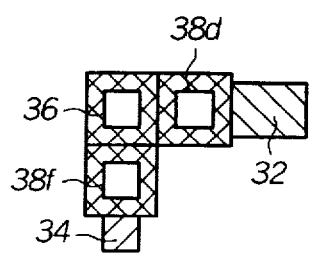
*FIG. 11*  *FIG. 12*
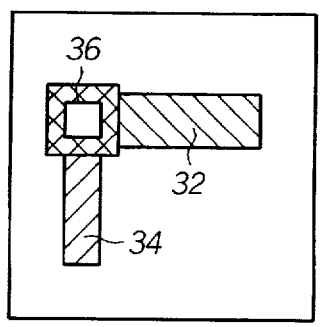 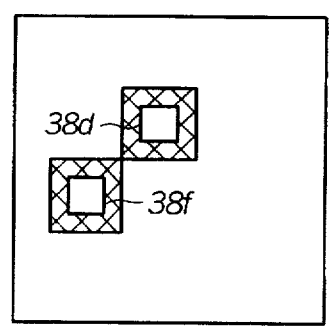
*FIG. 13*  *FIG. 14*

METHOD AND APPARATUS FOR FORMING REDUNDANT VIAS BETWEEN CONDUCTIVE LAYERS OF AN INTEGRATED CIRCUIT

FIELD OF THE INVENTION

The present invention relates generally to data processing systems for integrated circuits, and more particularly, to forming additional redundant inter-metal vias in a semiconductor integrated circuit to improve yield.

BACKGROUND OF THE INVENTION

Integrated circuits manufactured today contain several million transistors on a single integrated circuit substrate. In order to interconnect these millions of transistors to form a working packaged device, as many as eight layers of conductive material may be formed overlying the substrate and the transistors to interconnect the transistors functionally. In order for one conductive layer to couple to another conductive layer, contacts or via structures are used. Vias are typically openings etched through dielectric layers between a first conductive layer and a second conductive layer where the dielectric layer lies between the first conductive layer and the second conductive layer. Due to the fine lithographic features that are manufacturable today, many vias are formed having dimensions less than one micron. In many cases, a first conductive region and a second conductive region are intercoupled by only one via having a very small opening which is less than one square micron in size. This via is a critical via, and a failed critical via will most likely render an entire integrated circuit inoperable and a total financial loss.

In addition to integrated circuits containing numerous vias that are of a small size, vias are now manufactured using several conductive layers. A via will contain glue layers, plug layers, and capping layers where a single via can contain two or more conductive materials. In addition, the aggressive processing which is used to manufacture vias results in polymer veil formation which can cause conductors in a contact or via to delaminate or deteriorate over time. Therefore, in summary, a single integrated circuit worth several hundred or thousands of dollars can be rendered inoperable by a single defective critical via.

A method to improve the yield of devices by increasing the reliability of vias and contacts is needed in the integrated circuit industry.

BRIEF DESCRIPTION OF THE DRAWINGS

FIGS. 2–4 illustrate, in top perspective views, overlay layers as introduced in FIG. 1;

FIGS. 5–6 illustrates, in top perspective views, two redundant location patterns used to identify at least one redundant via location in close proximity to a critical via in accordance with the present invention;

FIGS. 7–10 together illustrate, in top perspective views, an outcome resulting from performing the method of FIG. 1;

FIGS. 11–14 together illustrate, in top perspective views, another outcome from performing the method of FIG. 1;

Figure 1:
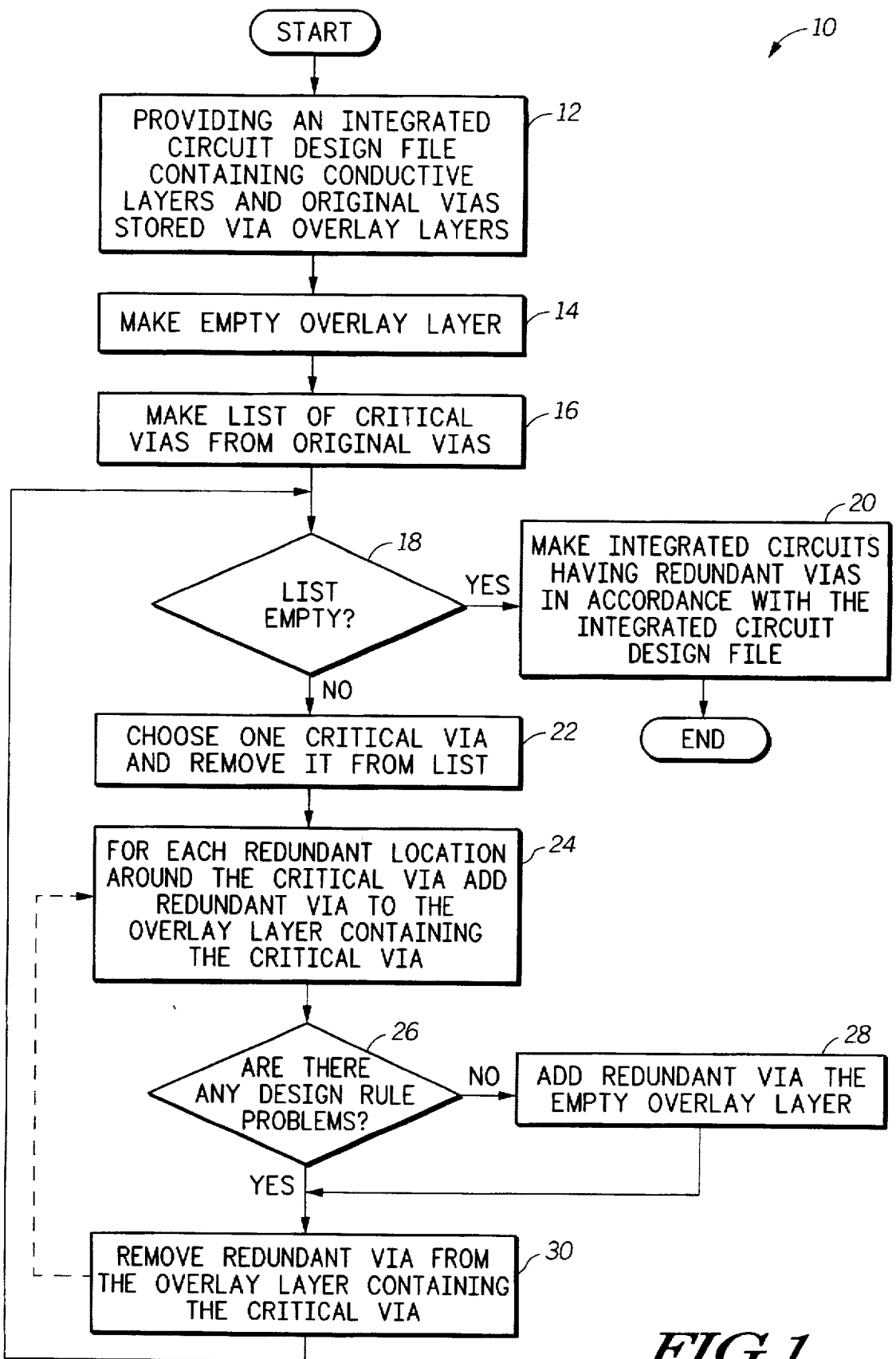
FIG. 1 illustrates, in a flowchart, a method for forming redundant cells in a integrated circuit design file where the integrated circuit design file contains critical vias in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention is a method and apparatus for forming redundant vias on an integrated circuit. Redundant vias connected in parallel to a single critical via will improve the functional yield of the integrated circuit. In an integrated circuit, millions of vias interconnect conductive layers so that transistors can function properly and perform useful computer operations. In many cases, an integrated circuit will be designed such that two or more conductive regions are connected to one another by a single critical via. If this single critical via fails or is defective in any way, the two or more conductive layers will not be properly intercoupled and the entire integrated circuit will be rendered useless. To avoid this loss in yield, critical vias are scanned by redundant via software.

The redundant via software scans for places in close proximity to the critical via where redundant vias can be placed electrically in parallel to the critical via. In another form, the redundant via software searches for areas that will allow the contact opening of the critical via to be extended or widened to improve the reliability of the critical via. The extended or widened critical via or a via which has been buttressed via one or more redundant vias is less likely to fail. Once a critical via has been surrounded by one or more redundant vias, both the redundant via(s) and the critical via must fail in order for two conductive layers to be improperly electrically disconnected. Since it is less likely statistically that two parallel connected vias will fail and since it is less likely that a larger extended critical via will fail, significant increase of integrated circuit yield has been observed using the redundant via methods taught herein.

The invention can be better understood with references to FIGS. 1–16 discussed below.

FIG. 1 illustrates a method used to place redundant vias around critical vias in an integrated circuit. Method 10 of FIG. 1 begins with a step 12. In step 12, an integrated circuit design file is provided. The integrated circuit design file contains a plurality of original vias stored in one or more overlay layers. Overlay layers are further discussed and defined via FIGS. 2–4 which follow. The integrated circuit design file is typically provided via computer aided design (CAD) tools which are used in the integrated circuit industry to design integrated circuit chips. Typically, the integrated circuit design file of FIG. 12 is an output file of a place-and-route tool wherein each original overlay layer defines a single layer or set of features used to form the integrated circuit. Each overlay layer typically indicates how a specific dielectric or conductive layer is photolithographically processed and/or etched to define various features of the integrated circuit. For example, the physical shape of a first metal layer, a set of inter-poly contacts, field oxide regions, ion implant regions, transistor gate electrodes, bonding pads, and like features are each defines two-dimensionally or three-dimensionally in one overlay layer of the integrated circuit design file. The overlay layers may be placed on top of one another to illustrate the entire aggregate integrated circuit from top to bottom.

After step 12, a step 14 is performed. In step 14, an empty overlay layer is created. This empty overlay layer (or redundant overlay layer) is an overlay layer in addition to the original overlay layers discussed via step 12 above. It is important to note that metal, polysilicon, or other conductive members which contact each other using the redundant vias taught herein will also need to be changed to conform to design rules given the added redundant via. For example, a conductive layer may need to be expanded physically in order to properly surround the redundant via to create a reliable electrical contact. These conductive layer modifications/extensions are also stored in redundant layers for to allow for deletion advantages taught herein. Therefore, when referring to a redundant via layer herein, to is important to remember that this redundant via layer may need to be accompanied by one or more redundant conductive layers which add to original conductive regions which are affected by the redundant via.

The integrated circuit design file or a related file is scanned in a step 16 to identify a plurality of critical vias from the original vias provided in step 12. A critical via is typically a via that connects a first conductive region to a second conductive region wherein no other via connects the first conductive region to a second conductive region. In other words, these vias are stand-alone vias wherein if the critical via fails, the electrical connection for which the via was formed is lost. Other critical vias may be vias which are critically placed on the integrated circuit, or vias that are more likely to fail than other vias due to processing constraints or physical placement. The list of critical vias in step 16 may be stored in a link list, an array, or another like data structure in a computer memory device.

A step 18 checks to determine if the list of critical vias is empty. If the integrated circuit contains no critical vias or all critical vias have been processed via steps 22–30, then step 20 is performed. In step 20, a plurality of integrated circuits are formed having redundant vias in accordance with the integrated circuit design file and in accordance with the steps 12–30. The details of fabricating an integrated circuit can be ascertained via the book *Silicon Processing for the VLSI Era*, Vol. 1-Proc. Tech., authored by Wolf & Tauber, published by Lattice Press, © 1986.

If one or more critical vias remain in the list created in step 16, steps 22–30 are performed for a critical via. In step 22, a critical via is chosen from the list and removed from the list created via step 16. In a step 24, for each redundant location around the critical via, a redundant via is added to the overlay layer containing the critical via. Redundant locations, which are also referred to as redundant windows, are further illustrated and taught in FIGS. 5 and 6. The placement of the redundant via within the overlay layer containing the critical via is illustrated in FIG. 8 and FIG. 12.

After a single redundant via is added in step 24 to a redundant location in close proximity to the critical via, a design rule checker algorithm is executed in a step 26. The design rule checker in step 26 scans the overlay layer containing both the critical via and the redundant via from step 24 to ensure that the redundant via is in accordance with various design rule parameters. Typical design rule parameters are derived to: (1) ensure that the redundant via has not improperly electrically short circuited to another conductive region; (2) ensure that the addition of the redundant via has not extended conductive layers too close to one another; (3) ensure that the capacitance of the conductive layers associated with the critical and redundant vias are still within specification; (4) ensure that the resistance of the conductive lines and vias associated with the critical and redundant vias are in accordance with design rule specifications; and (5) ensures that any other design rule condition is not violated by the addition of the redundant via in step 24. If design rule problems are identified in step 26, the redundant via is removed from the overlay layer containing the critical via by executing a step 30. In other words, the redundant via inserted in step 24 is removed via a step 30 when design rule problems are identified.

If no design rule problems are identified in step 26, step 28 adds all pertinent redundant via information and location to the empty overlay cell created in step 14. The empty overlay cell (or redundant overlay cell) is further taught via FIGS. 10 and 14. Even though no design rule problems were identified in a step 26, step 30 is still executed after step 28 to remove the redundant cell from the overlay layer of step 24 while preserving the redundant via in the empty overlay cell via step 28. The empty overlay layer, at the end of the process of FIG. 1, will store all redundant vias that can be added to the integrated circuit with no design rule violations, while the overlay layers containing critical vias will contain no redundant vias. Redundant vias are kept in a separate layer so that redundant vias need not be added to the existing original layers of the integrated circuit design file. Therefore, if the original integrated circuit design file provided in step 12 would need minor or major changes, the empty overlay layer or the redundant via overlay layer could be simply deleted thereby removing all redundant vias from the integrated circuit design file in a simple deletion process. In other words, the use of a redundant overlay layer or an empty overlay layer created via step 14 allows the redundant vias to be easily removed from the integrated circuit design file data base in order to easily restore the integrated circuit design file to its original non-redundant-via state. The redundant vias do not corrupt the original layers so that further product changes or derivatives may be easily made without having to tediously determine critical vias from redundant vias.

Step 18–30 are executed in a looping manner until all of the critical vias identified in a step 16 are correctly processed. It is important to note that the steps 18–30 are a single loop having an internal nested loop containing steps 24–30. In other words, if 100 critical vias are identified in the step 16, then the loop comprising steps 18–30 are executed 100 times for each via. For each via or each iteration of steps 18–30, steps 24–30 are executed a plurality of times for two to hundreds of redundant locations associated with each via. As FIGS. 5 and 6 will show, each critical via can have associated with it a single redundant window/ location or hundreds of redundant windows/locations depending upon design choice and processing power constraints. Therefore, if each critical via is associated with eight redundant locations as illustrated in FIG. 5 and 100 critical vias are located in step 18, then step 26 will be executed 8000 (100*8) times.

It is important to note that the method of FIG. 1 can be used for contacts formed between a polysilicon layer and a diffusion region formed in the substrate, a first polysilicon layer and a second polysilicon layer, a polysilicon layer and a metal layer, a first metal layer and a second metal layer, or any two conductive elements formed on an integrated circuit substrate.

Figure 2:
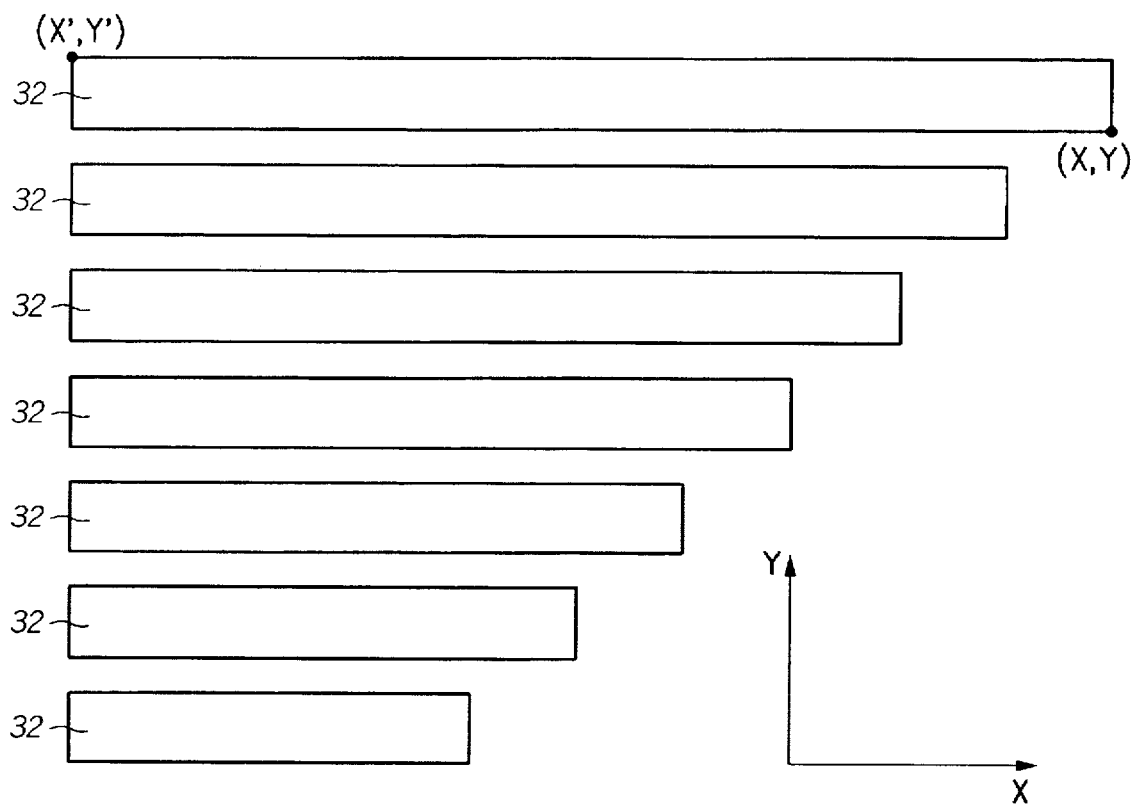
Figure 3:
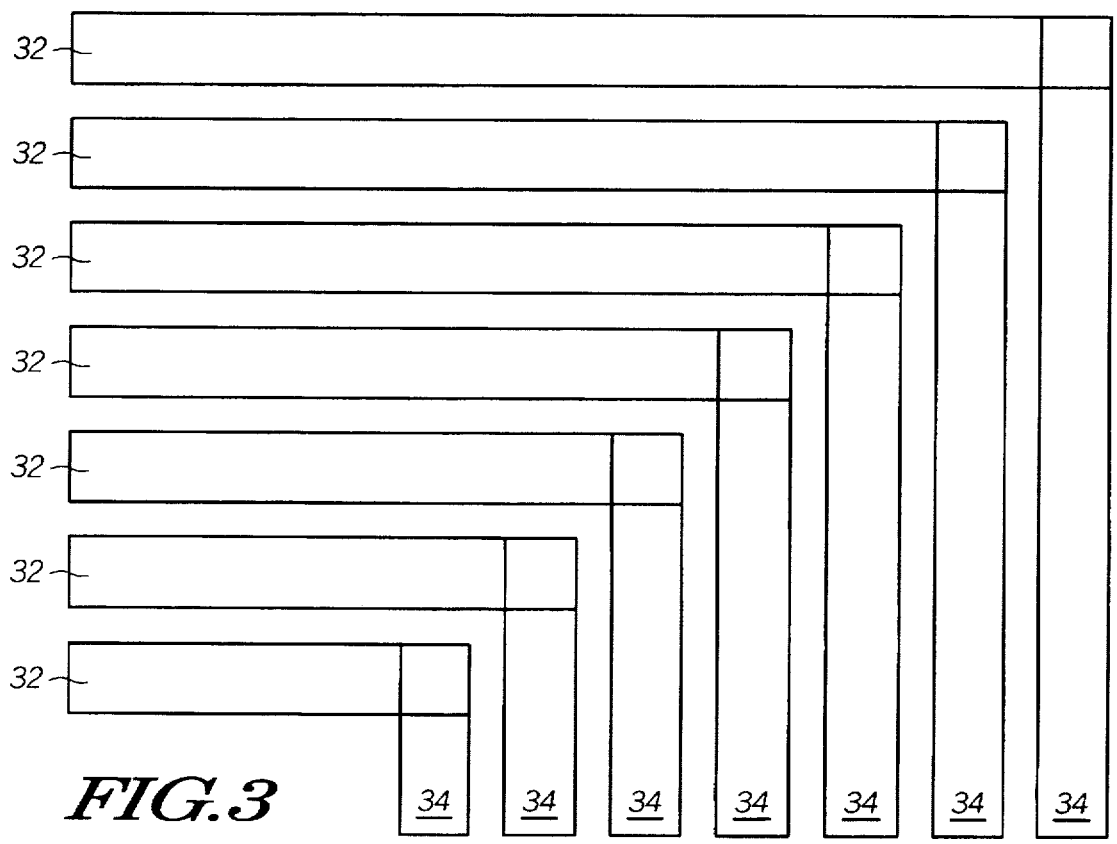

FIGS. 2–4 illustrate the concept of an overlay layer as introduced in FIG. 1, step 12. FIG. 2 illustrates a single overlay layer which contains a plurality of conductive members 32. Each overlay layer describes, in a coordinate system, specific physical features that are to be created over an integrated circuit substrate for form an integrated circuit. The coordinate system typically used is an X-Y coordinate system, but can easily be an other coordinate system such as a cylindrical or spherical system. In system. In some cases, the coordinate system is simply an integer unitless system, whereas other systems may be a coordinate system having the unit of length, such as microns or nanometers, in both the X and Y direction. The two-dimensional physical features stored/defined by an overlay layer are typically formed in the manufacturing process via lithographic patterning and/or etching processes known to the integrated circuit industry. For example, FIG. 2 illustrates a plurality of conductive layers 32 which are formed by depositing a blanket layer of a conductive material. The conductive material is then coated with photoresist where the photoresist is lithographically pattern and developed. The photoresist, after development, protects portions of the conductive layer and exposes other portions of the conductive layer. The conductive layer and remaining photoresist is then exposed to an etchant which etches away exposed portions of the conductive layer and leaves behind the patterned layers 32.

FIG. 2 illustrates an overlay layer that identifies and stores the physical shape of these remaining metallic layers which are formed after lithographic processing and etching. In another form, an overlay layer can define openings (i.e., lack of material) having a two-dimensional shape which are formed through a dielectric layer. In general, an overlay layer contains a database to define any two-dimensional top-down shape information for any feature formed on an integrated circuit. Typically, the layers can be numbered or referred to using integer values from 1 to N, wherein N is a finite positive integer. Many layers stacked on top of one another give the CAD design a three dimensional affect. Modern integrated circuit designs typically contain tens of overlay layers or hundreds of overlay layers which in the aggregate define the integrated circuit in a two-dimensional (or three-dimensional) manner. Layers that are numerically low in value are usually layers formed close to the substrate, whereas layers that are numerically high in value and closer to the value N are upper layers formed farthest away from a top portion of the integrated circuit substrate.

When using a two-dimensional coordinate system having an X-axis and a Y-axis as illustrated in FIG. 2, square or rectangle shapes are typically used to define feature geometries. These squares or rectangles are defined using two points in space in the overlay layer. These two points in the overlay layer space define square or rectangular shapes that either alone or together with other square/rectangular shapes form one or more features of the integrated circuit. For example, the top-most conductive region 32 of FIG. 2 can be defined via a two-dimensional point (X, Y) and a second two-dimensional point (X', Y'). An "L" shaped region would require two rectangular regions, one for each leg of the "L".

Integrated circuits can today be formed having a substrate or die size of roughly one inch by one inch. Therefore, overlay layers stored on a computer data base are typically very large wherein the space needed in both the X and the Y direction is substantial. Therefore, FIG. 2 only illustrates a small portion of one particular overlay layer.

While FIG. 2 illustrates a first overlay layer defining a first plurality of conductive layers 32, FIG. 3 illustrates the layer of FIG. 2 along with a second overlay layer comprising conductive members 34. Therefore, FIG. 3 illustrates two overlay layers, laid on top of one another in an aligned manner. Alignment occurs by using common X and Y systems for all layers in the integrated circuit file. In other words, the X-Y coordinate system used to define the conductive layers 34 are aligned or exactly equal to the X-Y coordinate system used to define the layers 32 so that when one coordinate system is laid on top of the other coordinate system, the layers 34 and 32 align in the same manner in which they will align in the actual manufactured integrated circuit. Therefore, the conductive layers 34 partially overly the conductive layers 32 as illustrated in FIG. 3, where the conductive layers 34 will overly the actual layers 32 when manufactured on an integrated circuit.

FIG. 4 illustrates a third overlay layer added to the two overlay layers illustrated in FIG. 3. The third overlay layer in FIG. 4 contains a plurality of vias or contact openings 36. The contacts 36 are used to connect the respective layers 34 to the respective layers 32. When manufacturing an integrated circuit, the underlying conductive layer 32 will be formed first, then the contacts 36 will be formed through a dielectric layer overlying layer 32. After the formation of the contact opening 36, any plug material will be formed followed by the conductive layer 34. Therefore, the overlay layers introduced in FIG. 1 and further discussed in FIGS. 2–4 correspond to integrated circuit layers which are formed on the actual integrated circuit in a manufacturing facility.

FIGS. 5 and 6 illustrate redundant locations as introduced in FIG. 1, step 24. In a preferred form, eight redundant locations, in addition to the critical via location 36, are analyzed via the steps 24–30 in FIG. 1. These eight redundant locations would surround the critical via 36 to form a 3×3 array of contact regions as illustrated in FIG. 5. FIG. 5 illustrates the eight redundant regions 38a through 38h surrounding the critical via 36 where the critical via 36 is a middle area of the 3×3 array of redundant locations. Each iteration of steps 24–30 in FIG. 1 fully analyzes one of the eight redundant regions 38a through 38h in FIG. 5 for one critical via. Each redundant region 38a through 38h in FIG. 1 that does not violate the design rules in step 26 of FIG. 1 is retained in the redundant overlay layer created in step 14 to bolster the reliability of the critical via.

FIG. 6 illustrates an extension of FIG. 5 where FIG. 6 indicates that more than eight redundant locations may be analyzed via the steps 24–30 in FIG. 1. It is important to note that any geometric redundant location pattern other than an n×n array may be used to replace the patterns illustrated in FIG. 5 and/or FIG. 6. It is also important to note that the redundant regions 38a through 38x illustrated in FIGS. 5 and 6 may be directly abutting one another and directly abutting the critical via 36, or may be slightly offset from each other as illustrated in FIGS. 5 and 6.

FIGS. 7–10 illustrate one outcome resulting from the execution of one loop through steps 18–30 in FIG. 1 for one via and eight redundant locations. FIG. 7 illustrates a portion of the integrated circuit design file provided via step 12 of FIG. 1. This portion of the integrated circuit design file illustrated in FIG. 7 is one small portion of three overlay layers. One overlay layer defines the conductive member 32, another overlay layer defines the conductive member 34, and yet another overlay layer defines a critical via 36. Therein, FIG. 7 illustrates one critical via 36, a bottom conductive layer 32, and a top conductive layer 34. The via 36 connects, in a vertical manner, the bottom layer 32 to the top layer 34. Design rules usually dictate that the layer 34 and the layer 32 surround a circumference of the contact 36 by some dimension as illustrated in FIG. 7.

The critical via 36 is placed in a list via step 16 in FIG. 1 and is selected via the step 22 of FIG. 1. The algorithm executed via steps 24–30 of FIG. 1 are using the pattern of FIG. 5 illustrated herein and not using the pattern of FIG. 6. Therefore, the step 24–30 are executed in series eight times to process the eight redundant locations 38a through 38h of FIG. 5. FIG. 8 indicates that the only via identified by step 26 (after eight iterations) that does not result in design rule problems is redundant via 38d. Therefore, redundant via 38d is physically placed into the redundant location 38d in the redundant overlay layer since via 36d was determined to incur no design problems in step 26 of FIG. 1. The redundant via 38d, subsequent to step 26, is then removed from the original layer containing via 36 in FIG. 8 to result in the final original overlay layer illustrated in FIG. 9 which is identical to the original overlay layer of FIG. 7. Since the redundant via 38d incurred no design rule problems, the redundant via 38d is placed via its X, Y coordinate system into the redundant overlay layer created in step 14 wherein the redundant layer is illustrated via FIG. 10. When the original overlay layer of FIG. 9 is aligned and displayed along with the overlay layer of FIG. 10, the illustration of FIG. 8 is once again created. As one would readily appreciate, if the overlay layer of FIG. 10 is deleted entirely, the structure illustrated in FIG. 7 will be restored in the integrated circuit file quickly and with no adverse affects.

It is important to note that FIG. 10 may be more than one redundant layer, a single layer, or a package of layers identified as one unit/cell. For example, in FIG. 10, not only is the redundant via 38d stored in a redundant via layer, but the metal regions 32 and 34 need to be extended/expanded to surround the redundant via in accordance with design rules (as is also evident from FIG. 8). These expanded metal layers are usually stored via redundant conductive overlay layers separate from the redundant via overlay layer. Therefore, FIG. 10 illustrates not only a redundant overlay layer containing via 38d, but contains a first conductive overlay layer containing expanded portions of layer 32 and a second conductive overlay layer containing expanded portions of layer 34.

The combination of these three layers may be referred to as a cell overlay.

FIGS. 11–14 illustrate a second outcome from executing the method of FIG. 1 on a single critical via 36. FIG. 11 is identical to FIG. 7 in that a critical via 36 is illustrated as coupling an underlying conductive layer 32 to an overlying conductive layer 34. After executing the steps 24 through 30 eight times for the eight redundant locations of FIG. 5, the redundant locations 38d and 38f were found to not violate any design rules in step 26 when added to the original overlay layer containing the critical via 36. Therefore, the critical via 36 is bolstered by the insertion of two redundant vias 38d and 38f in parallel to the via 36. The redundant vias 38f and 38d are placed in the redundant layer and removed from the layer containing the via 36 as discussed herein.

Therefore, in order for the interconnectivity of layer 32 to layer 34 to fail, all three vias 36, 38d and 38f must fail. The statistical chances of all three of these vias failing is significantly less than the statistical chance of a single via 36 failing. In order to properly couple the redundant vias 38d and 38f between layers 32 and 34, layers 32 and 34 must be extended over the vias 38d and 38f in accordance with the design rules discussed for FIG. 7. As with FIGS. 7–10, steps 28 and 30 ensure that the redundant vias 38d and 38f are removed from the original overlay layer containing via 36 and are placed according to their X, Y coordinates in the redundant overlay layer illustrated in FIG. 14. Therefore, FIG. 13 illustrates the original overlay layer and FIG. 14 illustrates the redundant overlay layer after processing the critical via with eight redundant location of FIG. 5. Once the overlay layer of FIG. 13 is displayed with the overlay layer of FIG. 14, FIG. 12 results. Expanded conductive layer overlay layers are also desirable in FIG. 14 as taught above.

Figure 15:
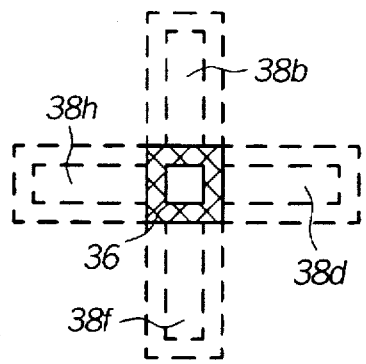
FIG. 15 illustrates, in a top perspective view, an extended via in accordance with the present invention.

FIGS. 7–14 illustrate that additional separate contact openings can be formed as parallel redundant vias to the original via 36. However, FIG. 15 illustrates that the opening 36 used to form the critical via 36 can be extended into the redundant regions 38a through 38x to form an extended or elongated via. In particular, FIG. 15 illustrates that a via can be extended into a cross-shaped formation, a T-shaped formation, or an L-shaped formation. A via which is larger in opening surface area is less likely to fail than a smaller surface area contact.

It is important to consider that today's technology involves plugging contact openings and via openings with metallic plugs. These metallic plugs comprise one or more of titanium nitride, tungsten, titanium, or other known metallic plug compounds. These compounds will typically only fill contact openings that are less than a maximum geometry. If this maximum geometry is assumed to be 1 micron, the plug technology could properly fill an opening that is 1 micron by 1 micron or could properly fill an opening that is 50 microns by 1 micron, but could not fill an opening that is 2 microns by 2 microns. Therefore, one dimension (either X or Y) of the contact opening must be limited to a feature size less than the maximum allowable geometry in order to obtain a proper conductive plug within the contact/via opening. This method then allows for the formation of cross-shaped (±shaped), T-shaped, and L-shaped vias long as one of either their width or length is less than this maximum possible feature size.

Figure 16:
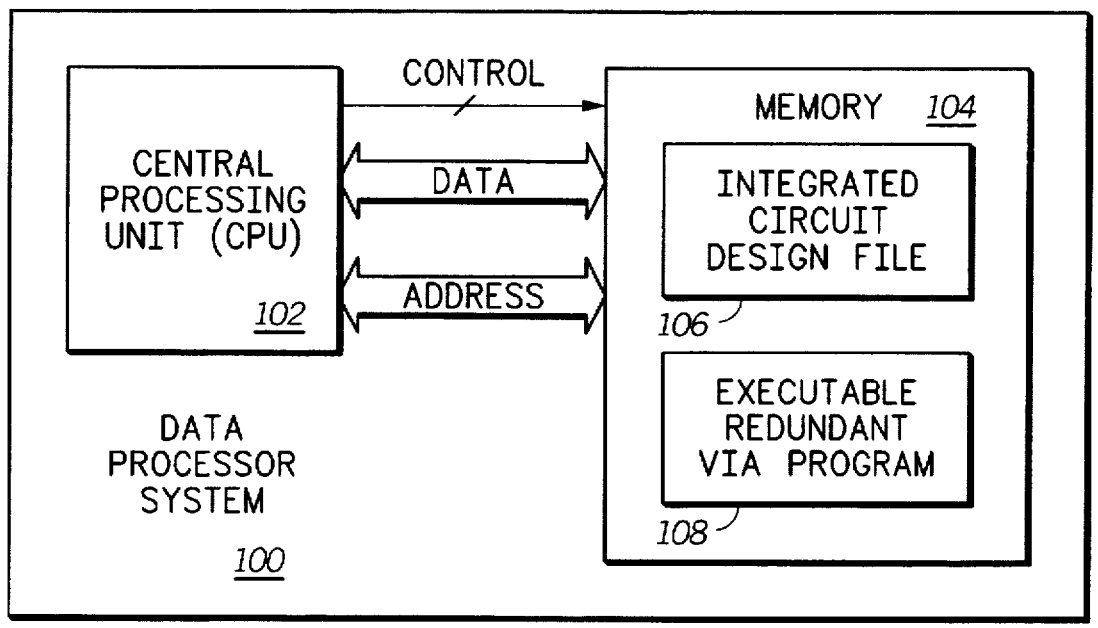
FIG. 16 illustrates, in a block diagram, an a data processing system which is used to perform the method of FIG. 1.

FIG. 16 illustrates an apparatus that can be used to execute the process of FIG. 1. FIG. 16 illustrates a central processing unit (CPU) 102 which is coupled to a memory 104 via a data bus, an address bus, and a control bus. The memory 104 and the CPU 102 reside in a data processor system 100 which can be a computer or a like execution device. Within the memory 104 is the integrated circuit design file 106 introduced in FIG. 1, step 12. Also in memory, is an executable redundant via program which is described in FIG. 1 by the steps 14–30. The CPU 102, through the control, data, and address buses, accesses the executable redundant via program 108. The CPU 102 then executes the program 108, and the program 108 operates on the integrated circuit design file 106 to create redundant vias as taught herein.

While the present invention has been illustrated and described with reference to specific embodiments, further modifications and improvements will occur to those skilled in the art. For example, plurality, as used herein, is intended to mean any integer value between 2 and infinity and should not be limited to a particular constant or sub-range within 2 to infinity. Memory, as used herein, means any EPROM, EEPROM, ROM, RAM, magnetic storage, optical storage, tape storage, flash memory storage, or like storage device for computer executable code or computer data. Close proximity is any place within roughly 100 microns of the specified feature. Storage media is any memory as defined above plus a floppy disk, a hard disk, any network storage media, drum storage, a compact disc, an optical disk, etc. The redundant via algorithm, as taught herein, may be used to form redundant interconnects, widen existing interconnects, form redundant capacitors, widen original capacitors, or improve/bolster any integrated circuit feature manufactured by some form of lithography and/or etching. The algorithm taught herein may be used to improve any contact or via, such as a buried contact. It is to be understood, therefore, that this invention is not limited to the particular forms illustrated and that it is intended in the appended claims to cover all modifications that do not depart from the spirit and scope of this invention.

What is claimed is:

1. A method for creating a redundant via in an integrated circuit, the method comprising the steps of:

providing an integrated circuit file in a memory which described the integrated circuit, the integrated circuit file defining a two-dimensional layout of a first conductive layer and a two-dimensional layout of a second conductive layer across the integrated circuit, the first conductive layer underlying the second conductive layer wherein an original via is coupled between the first conductive layer and the second conductive layer, the integrated circuit file being formed in accordance with predetermined design rules; and scanning locations in close proximity to the original via to find redundant locations where the redundant via is placed into at least one of the redundant locations to couple the first conductive layer to the second conductive layer in parallel to the original via so that at least two total vias are permanently coupled between the first conductive layer and the second conductive layer in the integrated circuit while the redundant via is in accordance with predetermined design rules wherein one of the redundant via or the original via can fail while the electrical connection between the first and second conductive segments will remain functional through use of a remaining functional via which is the other of either the redundant via or the original via.

2. The method of claim 1 wherein the step of scanning comprises:

scanning locations in close proximity to each original via in a plurality of original vias wherein each original via in the plurality of original vias couples a portion of the first conductive layer to a portion of the second conductive layer.

3. The method of claim 1 wherein the step of scanning comprises:

scanning eight predetermined locations wherein the eight predetermined locations surround the original via and are directly adjacent the original via.

4. The method of claim 1 wherein the step of providing comprises:

providing the integrated circuit file in a format that comprises a plurality of overlay layers wherein a first overlay layer defines the two-dimensional layout of a first conductive layer, a second overlay layer defines the two-dimensional layout of a first conductive layer, and a third overlay layer defines the original via along with any other original vias.

5. The method of claim 4 wherein the step of providing comprises:

providing the redundant via and any other redundant vias in a fourth overlay layer that is separate from the third overlay layer containing the original via.

6. The method of claim 1 wherein the step of scanning comprises:

extending one of either a conductive portion of the first conductive layer or a conductive portion of the second conductive layer in order to make electrical contact to the redundant via.

7. The method of claim 1 wherein the step of scanning comprises:

forming the redundant via between a diffusion region formed in a substrate and a polysilicon layer.

8. The method of claim 1 wherein the step of scanning comprises:

forming the redundant via between a first polysilicon layer and a second polysilicon layer.

9. The method of claim 1 wherein the step of scanning comprises:

forming the redundant via between a metallic layer and a polysilicon layer.

10. The method of claim 1 wherein the step of scanning comprises:

forming the redundant via between a first metallic layer and a second metallic layer.

11. The method of claim 1 wherein the step of scanning comprises:

forming the redundant via as an opening formed through a dielectric and forming the original via as an opening formed through the dielectric wherein the opening of the redundant via is physically separate from the opening of the original via.

12. The method of claim 1 wherein the step of scanning comprises:

forming the redundant via as an opening formed through a dielectric and forming the original via as an opening formed through the dielectric wherein the opening of the redundant via is physically joined with the opening of the original via to form one joined opening where the one joined opening is collectively larger in size than a size of opening for the original via.

13. The method of claim 1 further comprising:

forming a plurality of integrated circuits containing the original and redundant vias in accordance with the integrated circuit file.

14. The method of claim 1 further comprising:

further performing the steps of providing and scanning for the second conductive layer and a third conductive layer wherein the third conductive layer overlies both the first and second conductive layers.

15. A method for creating redundant vias in an integrated circuit, the method comprising the steps of:

(a) providing an integrated circuit design file in memory which defines a first conductive layer and a second conductive layer wherein the first conductive layer is split into a first plurality of physically separated regions and the second conductive layer is split into a second plurality of physically separated regions, the integrated circuit design file having a plurality of original vias intercoupling the first plurality of physically separated regions to the second plurality of physically separated regions;

(b) identifying a plurality of critical vias from the plurality of original vias;

(c) choosing one critical via from the plurality of critical vias wherein the one critical via couples one separated region from the first plurality of physically separated regions to another separated region of the second plurality of physically separated regions;

(d) placing one redundant via in a redundant location adjacent the one critical via wherein the one redundant via couples the one separated region to the another separated region along with the one critical via;

(e) invoking a design checker to test whether the one redundant via is in accordance with predetermined design rules;

(f) retaining the one redundant via as a part of the integrated circuit design file when the one redundant via does not violate the predetermined design rules and removing the one redundant via when the one redundant via does violate the predetermined design rules;

(g) repeating steps (d) through (g) until all potential redundant locations around the one critical via are exhausted; and (h) repeating steps (c) through (h) until all critical vias in the plurality of critical vias have been processed so that at least one critical via in the integrated circuit permanently contains one redundant via formed in parallel to the one critical via whereby two regions permanently couple the one separated region and the another separated region.

16. The method of claim 15 further comprising the step of:

forming a plurality of integrated circuits after the steps (a) through (h) have been performed, each integrated circuit in the plurality of integrated circuits being in accordance with the integrated circuit design file.

17. The method of claim 15 further comprising the step of:

repeating steps (b) through (h) for each set of two conductive layers in the integrated circuit design file which have original vias formed therebetween.

18. The method of claim 15 wherein step (b) comprises:

identifying critical vias as any via coupled from a first conductive region of the first conductive layer to a second conductive region of the second conductive layer wherein no other via couples the first conductive region to the second conductive region.

19. The method of claim 18 wherein the first conductive region is a region within the first plurality of physically separated regions and physically separated from all other physically separated regions within the first plurality of physically separated regions, and wherein the second conductive region is a region within the second plurality of physically separated regions and physically separated from all other physically separated regions within the second plurality of physically separated regions.

20. The method of claim 15 wherein a location of the one critical via along with the potential redundant locations form a 3×3 array of locations wherein the location of the one critical via is in a middle of the 3×3 array of locations.

21. The method of claim 15 wherein the step (e) further comprises:

checking to ensure at least one of a following: (1) the one separated region in the first plurality of physically separated regions has not been extended too close to any other region in the first plurality of physically separated regions as a result of the one redundant via; (2) the one separated region in the first plurality of physically separated regions has not been extended to electrically short circuit with any other region in the first plurality of physically separated regions as a result of the one redundant via; (3) a capacitance of the one separated region in the first plurality of physically separated regions has not increased out of bounds from capacitance design rules; and (4) a resistance of the one separated region in the first plurality of physically separated regions has not increased out of bounds from capacitance design rules.

22. The method of claim 15 wherein the step (e) further comprises:

checking to ensure all of the following: (1) the another separated region in the second plurality of physically separated regions has not been extended too close to any other region in the second plurality of physically separated regions as a result of the one redundant via; (2) the another separated region in the second plurality of physically separated regions has not been extended to electrically short circuit with any other region in the second plurality of physically separated regions as a result of the one redundant via; (3) a capacitance of the another separated region in the second plurality of physically separated regions has not increased out of bounds from capacitance design rules; and (4) a resistance of the another separated region in the second plurality of physically separated regions has not increased out of bounds from capacitance design rules.

23. The method of claim 15 wherein the integrated circuit design file is arranged in overlay layers wherein the plurality of critical vias are in a first overlay layer and the step (f) comprises:

retaining the redundant vias in an overlay layer separate from the first overlay layer.

24. A method for creating redundant vias, the method comprising the steps of:

(a) providing an integrated circuit design file in memory which defines a first conductive layer and a second conductive layer wherein a plurality of original vias couple the first conductive layer to the second conductive layer at various locations, the integrated circuit design file having overlay layers wherein the first conductive layer is defined in a first overlay layer, the plurality of original vias are defined in a second overlay layer, and the second conductive layer is defined in a third overlay layer;

(b) creating an extra overlay layer in addition to the first overlay layer, the second overlay layer, and the third overlay layer;

(c) scanning the integrated circuit design file to find a plurality of critical vias within the plurality of original vias;

(d) choosing one critical via from the plurality of critical vias, the one critical via coupling the first conductive layer to the second conductive layer;

(e) placing a redundant via in a redundant location both adjacent the one critical via and within the second overlay layer wherein the redundant via couples the first conductive layer to the second conductive layer in a manner similar to the one critical via;

(f) using a design checker to determine if the redundant via as placed in step (e) conforms to predetermined design rules;

(g) adding the redundant via to the extra overlay layer when the design rules are not violated as determined in step (f);

(h) removing the redundant via from the second overlay layer;

(i) repeating steps (e) through (i) for several possible redundant locations; and (j) repeating steps (d) through (j) for all critical vias in the plurality of critical vias.

25. The method of claim 24 further comprising the step of:

(k) repeating steps (c) through (k) for more pairs of conductive layers wherein the pairs of conductive layers have vias coupled therebetween, the pairs of conductive layers.

26. The method of claim 24 wherein step (c) further comprises:

identifying a critical via as being a via that couples a first conductive member within the first conductive layer to a second conductive member within the second conductive layer wherein no other via couples the first conductive member to the second conductive member.

27. The method of claim 24 wherein step (c) further comprises:
identifying a critical via as being a via that couples a first conductive member within the first conductive layer to a second conductive member within the second conductive layer wherein no other via couples the first conductive member to the second conductive member.

28. The method of claim 24 further comprising the step of:
(k) manufacturing a plurality of integrated circuits having the plurality of critical vias and the redundant via in accordance with the integrated circuit design file.

29. An apparatus for creating redundant vias in a design file, the apparatus comprising:
a central processing unit (CPU) for executing computer instructions;
a memory unit for storing computer instructions and the design file, the memory unit containing:
the design file wherein the design file defines a first conductive layer and a second conductive layer which are intercoupled via a plurality of original vias; and
an executable file containing instructions for scanning discreet two-dimensional column and row locations in close proximity to an original via in the plurality of original vias to find at least one redundant location where a redundant via is placed into the at least one redundant location to couple the first conductive layer to the second conductive layer in parallel to the original via while the redundant via is in accordance with predetermined design rules of the design file; and
a bus coupling the central processing unit to the memory unit so that information can be provided between the central processing unit and the memory unit, wherein the central processing unit executes the instructions from the executable file to place and process the redundant vias within the design file.

30. A redundant via processor comprising:
means for accessing an integrated circuit file wherein the integrated circuit file defines a two-dimensional layout of a first conductive layer and a two-dimensional layout of a second conductive layer, the first conductive layer underlying the second conductive layer wherein an original via is coupled between the first conductive layer and the second conductive layer, the integrated circuit file being formed in accordance with predetermined design rules; and
means for scanning locations in close proximity to the original via to find a redundant location, wherein a redundant via is placed into the redundant location to couple the first conductive layer to the second conductive layer in parallel to the original via so that at least two total vias are permanently coupled between the first conductive layer and the second conductive layer in the integrated circuit while the redundant via is in accordance with predetermined design rules.

31. The redundant via processor of claim 30 wherein the means for accessing and the means for scanning are executable code stored via a storage media.

32. The redundant via processor of claim 30 wherein the integrated circuit file stores the first conductive layer via a first overlay layer, stores the original via in a second overlay layer, stores the second conductive layer in a third overlay layer, and stores the redundant via in a fourth overlay layer different from the second overlay layer.

33. The redundant via processor of claim 30 wherein the means for scanning scans eight predetermined locations wherein the eight predetermined locations surround the original via and are directly adjacent the original via.

34. The redundant via processor of claim 30 wherein the redundant via is an opening formed through a dielectric and the original via is an opening formed through the dielectric wherein the opening of the redundant via is physically joined with the opening of the original via to form one joined opening where the one joined opening is collectively larger in size than a size of opening for the original via.

35. A method for inserting redundant features into an integrated circuit design file, the method comprising:
identifying an original feature in the integrated circuit design file wherein the original feature is located in an original location;
processing eight locations adjacent the original feature wherein the eight locations along with the original location form a 3×3 array of locations wherein the original feature is a central location in the 3×3 array of locations, the step of processing being used to determine if a redundant feature that is similar in functionality to the original feature can be placed within one of the eight locations to improve the functionality of the original feature by placing the original feature and the redundant feature in parallel to each other; and
placing the redundant feature in the one of the eight locations when the step of processing succeeds in finding the one of the eight locations which is in accordance with predetermined design rules.

36. A file structure containing redundant vias, the file structure comprising:
a first overlay layer of the file structure defining a two-dimensional layout of a first conductive layer;
a second overlay layer of the file structure defining a two-dimensional layout of a plurality of vias;
a third overlay layer of the file structure defining a two-dimensional layout of a second conductive layer wherein the second conductive layer is to overlie the first conductive layer in an integrated circuit and the plurality of vias intercouple the first and second conductive layers; and
a fourth overlay layer of the file structure defining redundant vias which are used to couple the first conductive layer to the second conductive layer in addition to the plurality of vias.

37. The file structure of claim 36 comprising:
a fifth overlay layer of the file structure defining expansion regions used to expand the first conductive layer to properly surround the redundant vias.

38. The file structure of claim 37 comprising:
a sixth overlay layer of the file structure defining expansion regions used to expand the second conductive layer to properly surround the redundant vias.

39. A method for manufacturing integrated circuits having at least one redundant via, the method comprising:
providing an integrated circuit design file containing a plurality of vias which interconnect a first conductive segment and a second conductive segment;
scanning the plurality of vias to identify a critical via which is the only via coupled between the first conductive segment and the first conductive segment;
scanning various locations around the critical via to identify at least one redundant location such that: (1) at least one redundant via is placed within the at least one redundant location; (2) the at least one redundant via does not violate design rules that were used to verify the integrated circuit design file; and (3) the at least one redundant via couples the first conductive segment to the second conductive segment electrically in parallel with the critical via;

adding the redundant vias to the integrated circuit design file so that two vias now couple between the first conductive segment and the second conductive segment; and manufacturing a plurality of integrated circuits that contain the at least one redundant via and the critical via coupled in parallel between the first conductive segment and the second conductive segment in accordance with the integrated circuit design file wherein one of the redundant via or the critical via can fail while the electrical connection between the first and second conductive segments will remain functional.

* * * * *